United States Patent
Cornolti et al.

(10) Patent No.: US 7,503,237 B2
(45) Date of Patent: Mar. 17, 2009

(54) DEVICE FOR ADJUSTING THE POSITION OF THE OPERATING LEVER OF A HYDRAULIC ACTUATOR

(75) Inventors: Raffaello Cornolti, Sorisole (IT); Pierangelo Gherardi, Zogno (IT)

(73) Assignee: Freni Brembo S.p.A., Bergamo (IT)

( * ) Notice: Subject to any disclaimer, the term of this patent is extended or adjusted under 35 U.S.C. 154(b) by 194 days.

(21) Appl. No.: 10/296,968

(22) PCT Filed: Mar. 23, 2001

(86) PCT No.: PCT/EP01/03314

§ 371 (c)(1),
(2), (4) Date: May 21, 2003

(87) PCT Pub. No.: WO01/94193

PCT Pub. Date: Dec. 13, 2001

(65) Prior Publication Data

US 2003/0183038 A1   Oct. 2, 2003

(51) Int. Cl.
*G05F 1/04* (2006.01)
(52) U.S. Cl. .................................... 74/525; 74/502.2
(58) Field of Classification Search ............... 74/502.2, 74/523, 525, 516, 518; 60/533, 584, 594; 188/196 BA, 265; 192/85 R, 99 S, 110 R
See application file for complete search history.

(56) References Cited

U.S. PATENT DOCUMENTS 3,826,007 A * 7/1974 Senshu et al. ................. 33/432

(Continued)

FOREIGN PATENT DOCUMENTS

DE    44 08 741 A    10/1994

(Continued)

OTHER PUBLICATIONS

Patent Abstracts of Japan, vol. 2000, No. 7, Sep. 29, 2000 & JP 2000 095173 A, Apr. 4, 2000.

(Continued)

*Primary Examiner*—Richard W L Ridley
*Assistant Examiner*—James Pilkington
(74) *Attorney, Agent, or Firm*—Nixon & Vanderhye (57) ABSTRACT

A device for adjusting the position of the brake lever of a motorcycle comprises a bracket (5) connectable to a handlebar (4), a brake lever (2) extending in an essentially longitudinal direction (X-X), pivotally mounted on the bracket (5) and intended to be moved towards or away from a hydraulic actuator (3), and an adjustment lever (9) pivotally mounted on the bracket (5) and functionally connected to the brake lever (2) in order to operate the hydraulic actuator (3) when the brake lever (2) moves towards the hydraulic actuator (3). The device (1) possesses means (15) for adjusting the position of the brake lever (2) with respect to the adjustment lever (9), these means comprising a pin (16) extending in the longitudinal direction (X-X) in a continuation of the brake lever (2), which pin is engaged in such a way that it can be adjusted axially with respect to the brake lever (2) and is engaged in abutment with the adjustment lever (9), so that a movement in the longitudinal direction (X-X) of the pin (16) with respect to the brake lever (2) corresponds to a change in the position of the brake lever (2) with respect to the adjustment lever (9).

11 Claims, 6 Drawing Sheets

U.S. PATENT DOCUMENTS

| | | | |
|---|---|---|---|
| 4,301,694 A * | 11/1981 | Costa | 74/518 |
| 4,560,049 A * | 12/1985 | Uchibaba et al. | 192/85 R |
| 4,635,442 A * | 1/1987 | Bass | 60/594 |
| 4,642,072 A * | 2/1987 | Nagano | 474/82 |
| 4,709,306 A * | 11/1987 | Harris et al. | 362/530 |
| 4,779,482 A | 10/1988 | Kawaguchi | 74/523 |
| 4,840,082 A * | 6/1989 | Terashima et al. | 74/523 |
| 5,050,381 A | 9/1991 | Matsuno et al. | 60/584 |
| 5,636,518 A | 6/1997 | Burgoyne et al. | 60/594 |
| 5,762,158 A * | 6/1998 | Sumner, Jr. | 180/219 |
| 6,098,488 A * | 8/2000 | Vos | 74/502.2 |
| 6,371,891 B1 * | 4/2002 | Speas | 482/57 |
| 6,393,936 B1 * | 5/2002 | Barnett | 74/523 |

FOREIGN PATENT DOCUMENTS

| | | | |
|---|---|---|---|
| DE | 4408741 A1 * | 10/1994 | |
| EP | 0 405 945 A | 1/1991 | |
| GB | 2321682 A * | 8/1998 | |
| JP | 01237282 A * | 9/1989 | |

OTHER PUBLICATIONS

Patent Abstracts of Japan, vol. 1998, No. 1, Jan. 30, 1998 & JP 09 249180 A, Sep. 22, 1997.

* cited by examiner

DEVICE FOR ADJUSTING THE POSITION OF THE OPERATING LEVER OF A HYDRAULIC ACTUATOR

This application is the U.S. national phase of international application PCT/EP01/03314 filed 23 Mar. 2001, which designated the US. US National Phase of PCT/EP01/03314.

The present invention relates to a device for adjusting the position of the operating lever of a hydraulic actuator, especially the pump of the brake system or of the hydraulic clutch of a motorcycle.

With the sole purpose of simplifying the explanation of the present invention, the remainder of the description will refer to a hand-controlled lever fitted to the handlebar of a motorcycle for operating the pump of the brake system, hereinafter termed the brake lever.

As is well known, in motorcycles, the brake lever is positioned at the right-hand end of the handlebar, close to the steering handgrip on which the throttle control is fitted.

It is also well known that the position of the brake lever, or to be more precise the distance between the brake lever and the handlebar handgrip, is very often not quite appropriate for the real needs of many users, owing to the anthropometric differences of each person. There is therefore a widely felt need to be able to provide a device for adjusting the distance between the brake lever and the handlebar handgrip in a precise and rapid manner.

This need is especially familiar to racing motorcyclists, for whom the absolute precision and reduced fatigue of operation of the brake lever during trials and/or racing is essential if the maximum performance is to be obtained during a race.

In order to meet this need it has been proposed that use be made of devices capable of adjusting the position of the brake lever with respect to the hydraulic actuator and hence also with respect to the handlebar handgrip of the motorcycle.

Known adjustment devices comprise a main lever and an adjustment lever connected to it to operate the pump of the brake system as the main lever is brought towards the handlebar handgrip. The main lever and the adjustment lever are connected to each other by a threaded pin which can be rotated to adjust the position of the main lever with respect to that of the adjustment lever and hence the distance between the handlebar handgrip and the main lever on which the user acts manually in order to brake.

It should be pointed out that the abovementioned adjustment devices have the drawback of not allowing the distance between the main lever and the handlebar handgrip to be adjusted unless the motorcycle is stationary. This is because, in the abovementioned adjustment devices, the threaded pin that allows the position of the main lever to be adjusted substantially lies in the continuation of the axis of the brake pump piston, i.e. along a direction more or less perpendicular to the longitudinal axis of the main lever. In practice, therefore, it is impossible for the user to operate the adjustment device without taking his hands off the handlebar handgrip.

In this connection it may be observed that for a normal user it is acceptable, though inconvenient, to stop in order to adjust the position of the brake lever. However, for a racing motorcyclist involved in a competition, the idea of stopping in order to carry out an adjustment is quite out of the question, and it is not even possible to take the hand off the handlebar handgrip to which the throttle control is fitted.

Accordingly, the adjustment device must be easy to operate while the vehicle is moving without compromising the safety of the rider. It is worth pointing out that the need to vary the position of the brake lever while the vehicle is in motion arises in other situations than racing, for example during a long motorway journey.

The use of a remote-operated control system comprising a flexible cable capable of transmitting a twisting moment as a means of turning the pin has been proposed. However, the flexible cable has to negotiate an at least 90° bend of short radius close to the point of connection to the threaded pin, which introduces friction, irregularity and imprecision in the operation of the adjustment device.

The need for the wire to make the abovementioned bend could be obviated by introducing a bevel gear transmission between the end of the threaded pin that is to be turned, and the end of the flexible connecting cable. This would greatly increase the complexity of construction of the adjustment device, besides increasing the size and cost of manufacture, so militating against the use of this transmission.

The problem addressed by the present invention is that of devising and providing a device for adjusting the position of the operating lever of a hydraulic actuator, such as a motorcycle brake lever, the structural and functional characteristics of this device being such as to fulfil the above requirements and, at the same time, to overcome the drawbacks cited with reference to the prior art.

This problem is solved by a device for adjusting the position of the operating lever of a hydraulic actuator in accordance with claim 1.

Other characteristics and the advantages of the adjustment device according to the invention will become clear in the course of the description given below of certain preferred embodiments thereof. These examples are provided by way of non-restrictive guidance and refer to the accompanying figures, in which.

Referring to the accompanying drawings, the number 1 is a general indication for a device for adjusting the position of the operating lever 2 of a hydraulic actuator 3 such as the brake pump of the brake system or of the hydraulic clutch of a motorcycle. In the example considered here, the abovementioned operating lever is the hand-controlled lever mounted on the handlebar 4 (only partly indicated in broken lines in the figures) of a motorcycle. By acting on this lever it is possible to operate the brake pump 3 of the brake system. In the remainder of this text the abovementioned lever will be referred to as brake lever 2. As is well known, the brake lever 2 is positioned at the right-hand end of the motorcycle handlebar, close to the handgrip to which the throttle control is fitted.

The adjustment device 1 comprises a bracket 5 with means for mounting it firmly on a supporting structure which, in the example, is the handlebar 4 of the motorcycle.

Figure 1:
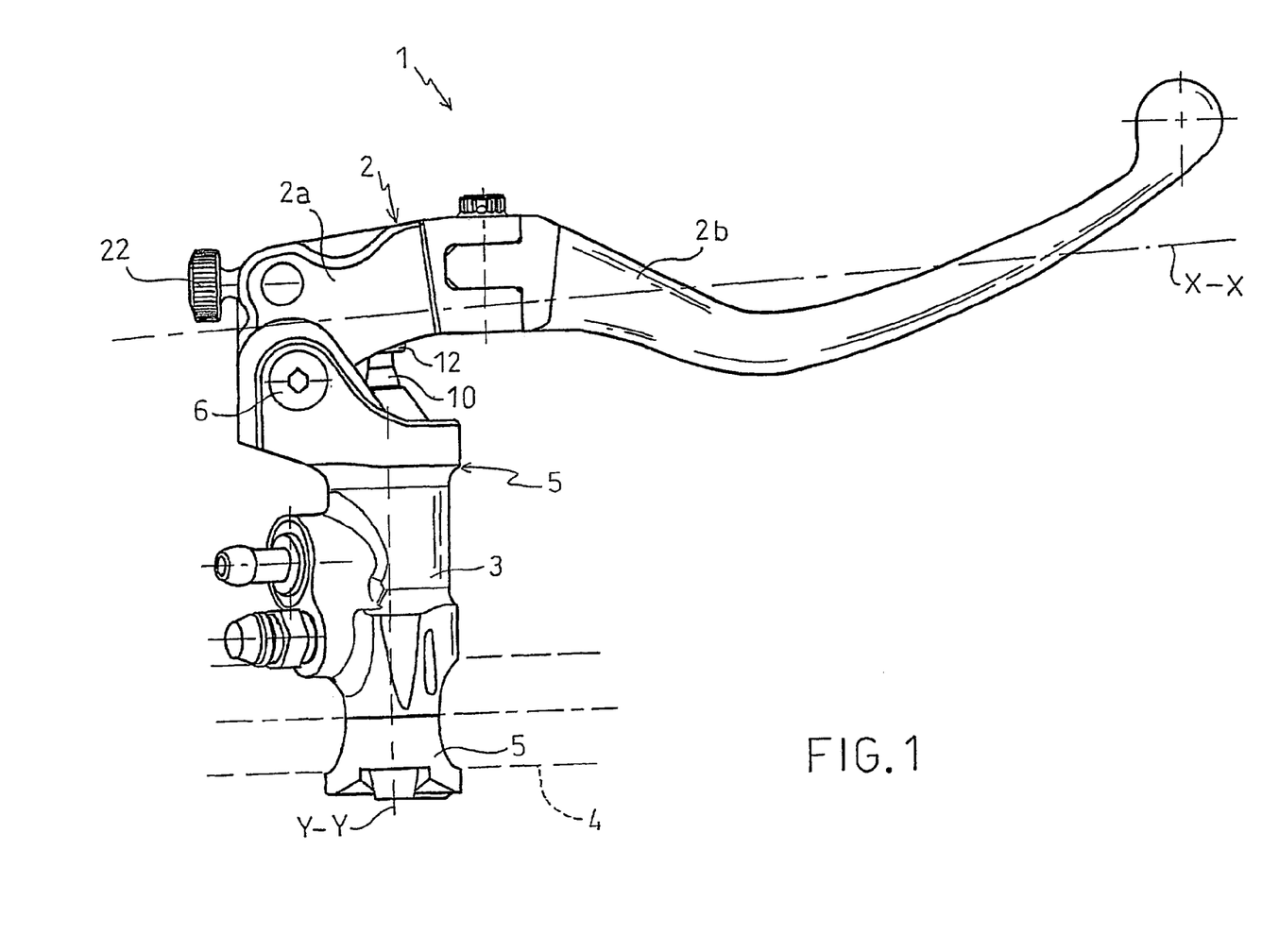
FIG. 1 is a plan view of an adjustment device according to the invention.

The brake lever 2 comprises an end block 2a from which a slender part 2b extends in an essentially longitudinal direction X-X. The slender part is intended to be grasped by a user of the motorcycle using the fingers of the hand, while the palm bears against the corresponding handlebar handgrip. The slender part 2b of the brake lever 2 is shaped to a curved line so as to be ergonomical and make it easier to grip. In this description the expression "longitudinal direction X-X" is used to refer to that direction defined by the straight line passing through the end block 2a of the brake lever 2 and interpolating the line of the slender part 2b (FIG. 1).

In the example seen in the figures, the end block 2a and the slender part 2b of the brake lever 2 are two separate parts joined together by a connecting screw. The brake lever 2 may have also been made in one piece.

The end block 2a of the brake lever 2 is pivotally mounted on the bracket 5 by means of a pin 6, thus being able to move angularly towards and away from the corresponding handgrip of the handlebar 4. The pin 6 extends in a direction Z-Z that substantially coincides with the normal to the plane passing through both the brake lever 2 and the handlebar 4 (i.e. normal to the plane of the drawing in FIGS. 1 and 2).

The brake pump 3 is integral with the bracket 5 and, in the example, is positioned so that the piston which it contains is able to move in a transverse direction Y-Y running from the handle 4 towards the brake lever 2, between an end-of-travel rest position (FIG. 2), to which the piston 7 is urged by an opposing spring 8, and an advanced working position to which the piston 7 moves when the brake pump 3 is pushed against the opposing spring 8 and against the pressure of the brake fluid contained inside the body of the brake pump 3. In particular, when moving from the end-of-travel rest position to the advanced position, the piston 7 moves towards the handlebar 4 along the transverse direction Y-Y.

Figure 2:
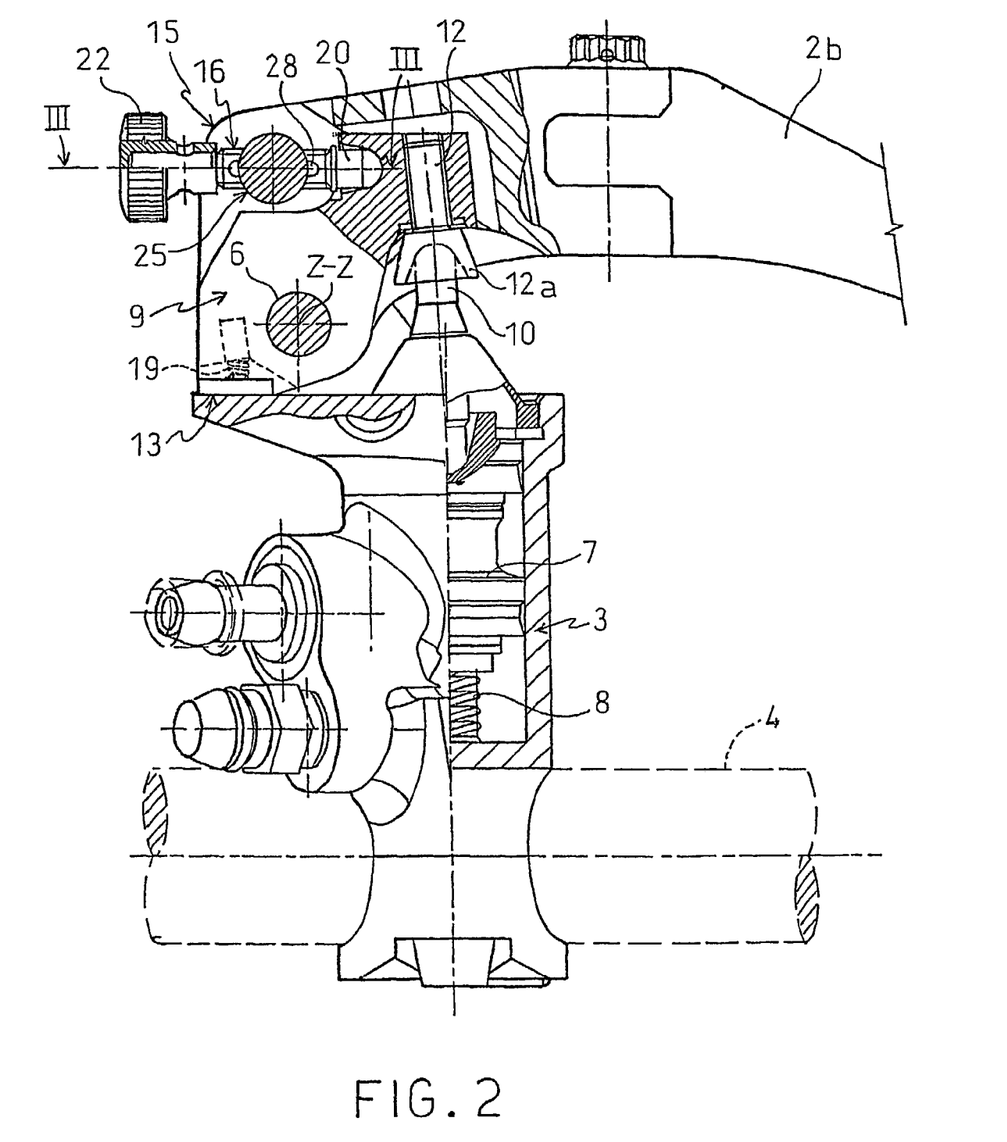
FIG. 2 is a plan view with parts in section of the adjustment device seen in FIG. 1.

Connected to the piston 7 is a control rod 10 extending roughly in the transverse direction Y-Y and projecting from the body of the brake pump 3 from the end nearest the brake lever 2. When the control rod 10 is depressed with a defined axial force, the brake pump 3 is operated, meaning that the piston 7 advances from the end-of-travel rest position to an advanced position.

In a purely conventional way, the brake pump 3 has hydraulic fluid inlet and outlet apertures. The end-of-travel rest position of the piston 7 is adjusted so that in this position the piston 7 does not close the hydraulic fluid inlet aperture of the brake pump 3.

It will be clear from the above that when the brake lever 2 moves either towards or away from the handlebar 4 handgrip, the brake lever 2 is simultaneously moving towards or away from, respectively, the brake pump 3.

The adjustment device 1 also includes an adjustment lever 9 that is pivotally mounted on the bracket 5 and is functionally connected to the brake lever 2 so as to act on the control rod 10 and operate the brake pump 3 when the brake lever 2 is pulled towards the said brake pump.

The adjustment lever 9 is preferably in line with the brake lever 2 and is pivotally mounted on the bracket 5 by the same pin 6, so that it moves together with the brake lever 2 towards and away from the brake pump 3 and hence towards and away from the handlebar 4 handgrip.

The rear portion of the adjustment lever 9 includes a bearing surface 13 by way of an end stop for the rotation of the adjustment lever 9 about the pin 6 away from the brake pump 3 (anticlockwise direction with reference to FIGS. 1 and 2): when the adjustment lever 9 rotates away from the brake pump 3, the bearing surface 13 interferes with the bracket 5, abutting against it in an end-of-travel position.

The action of the opposing spring 8 on the piston 7 of the brake pump 3 causes the control rod 10 to act on the adjustment lever 9 in such a direction that it tends to hold its bearing surface 13 against the bracket 5 with a predetermined elastic load.

A threaded through hole 11 is preferably formed in the adjustment lever 9 with the threaded shank of an adjustment screw 12 screwed into it. The adjustment screw 12 has a head 12a projecting from the adjustment lever 9 on which the end of the control rod 10 acts. Consequently the effect of screwing or unscrewing the adjustment screw 12 into or out of the adjustment lever 9, thereby varying the distance between the head 12a and the adjustment lever 9, is to adjust the position taken up by the control rod 10 and hence to adjust the abovementioned end-of-travel rest position of the piston 7 inside the brake pump 3.

The end of the control rod 10 that acts against the adjustment screw 12 is preferably rounded, while the head 12a of the adjustment screw 12 is given a flared hemispherical recess to take the abovementioned rounded end of the control rod 10.

Alternatively, the adjustment means used to adjust the relative position of the adjustment lever 9 with respect to the brake pump 3, i.e. the rest end-of-travel of the piston 7, may take the form of other, functionally equivalent elements, such as a grub screw.

The rotational end of travel of the adjustment lever 9 and of the brake lever 2 as they move towards (clockwise direction with reference to FIGS. 1 and 2) the brake pump 3 is determined by the furthest possible advanced working position of the piston 7 before the latter touches the bottom of the body of the brake pump 3 or before the turns of the opposing spring 8 become fully closed.

The adjustment device 1 is also provided with means 15 for adjusting the position of the brake lever 2 with respect to the adjustment lever 9, that is to say adjustment of the distance between the slender part 2b of the brake lever 2 and the corresponding handlebar 4 handgrip.

In the example, the abovementioned means 15 for adjusting the position of the brake lever 2 with respect to the adjustment lever 9 comprise a pin 16 oriented approximately along the said longitudinal direction X-X. The pin 16 is engaged with the brake lever 2 in such a way that it can be adjusted axially along the abovementioned longitudinal direction X-X and, at the same time, is engaged in abutment with the adjustment lever 9, so that a movement in the longitudinal direction X-X of the pin 16 with respect to the brake lever 2 corresponds to a change in the position of the brake lever 2 with respect to the adjustment lever 9.

In a preferred embodiment, the engagement whereby the pin 16 can be adjusted axially along the longitudinal direction X-X relative to the brake lever 2 is provided by the fact that the pin 16 has an external thread screwed into a threaded through hole 18 running through a centring support 14. This centring support 14 extends axially in the abovementioned vertical direction Z-Z and is pivotally mounted in the end block 2a of the brake lever 2 so as to be able to rotate about its own axis. Consequently it is possible, by rotating the pin 16 with respect to the centring support 14, to alter the relative position of the pin 16 with respect to the brake lever 2 in the longitudinal direction X-X.

The end 20 of the threaded pin 16 projecting from the abovementioned through hole 18 abuts against the adjustment lever 9. To this end the adjustment device 1 comprises elastic means 19 acting on the end block 2a of the brake lever 2 and on the adjustment lever 9 in order to maintain contact, with a defined elastic load, between the end 20 of the threaded pin 16 and the adjustment lever 9. In the example the elastic means 19 take the form of two helical springs 19, each acting between opposing end portions of the brake lever 2 and of the adjustment lever 9, such as to cause the brake lever 2 to rotate about the pin 6 and towards the brake pump 3 (clockwise direction with reference to FIGS. 1 and 2), thereby taking up any slack and ensuring that the abovementioned levers do not chatter against each other when subject to vibrations and the like.

The end 20 of the threaded pin 16 is preferably rounded and in abutment with a corresponding flared hemispherical recess 21 formed in the adjustment lever 9.

The abovementioned means 15 for adjusting the position of the brake lever 2 with respect to the adjustment lever 9, in other words the threaded pin 16, are advantageously accessible and can therefore be controlled from outside of the adjustment device 1, more specifically from the outer region of the adjustment device, where the inner region of the adjustment device 1 is taken to be that defined between the slender part 2b of the brake lever 2 and the brake pump 3, i.e. that facing the handlebar 4 handgrip.

The pin 16 preferably extends in the longitudinal direction X-X in an approximate continuation of the brake lever 2, or more precisely of the slender part 2b of that lever.

Connected to the pin 16 is a control member, e.g. a knurled nut 22 or the like, that can easily be turned even with just one digit of the hand, such as the thumb. The knurled nut 22 preferably engages with an end portion of the pin 16 projecting from the end block part 2a of the brake lever 2.

Figure 7:
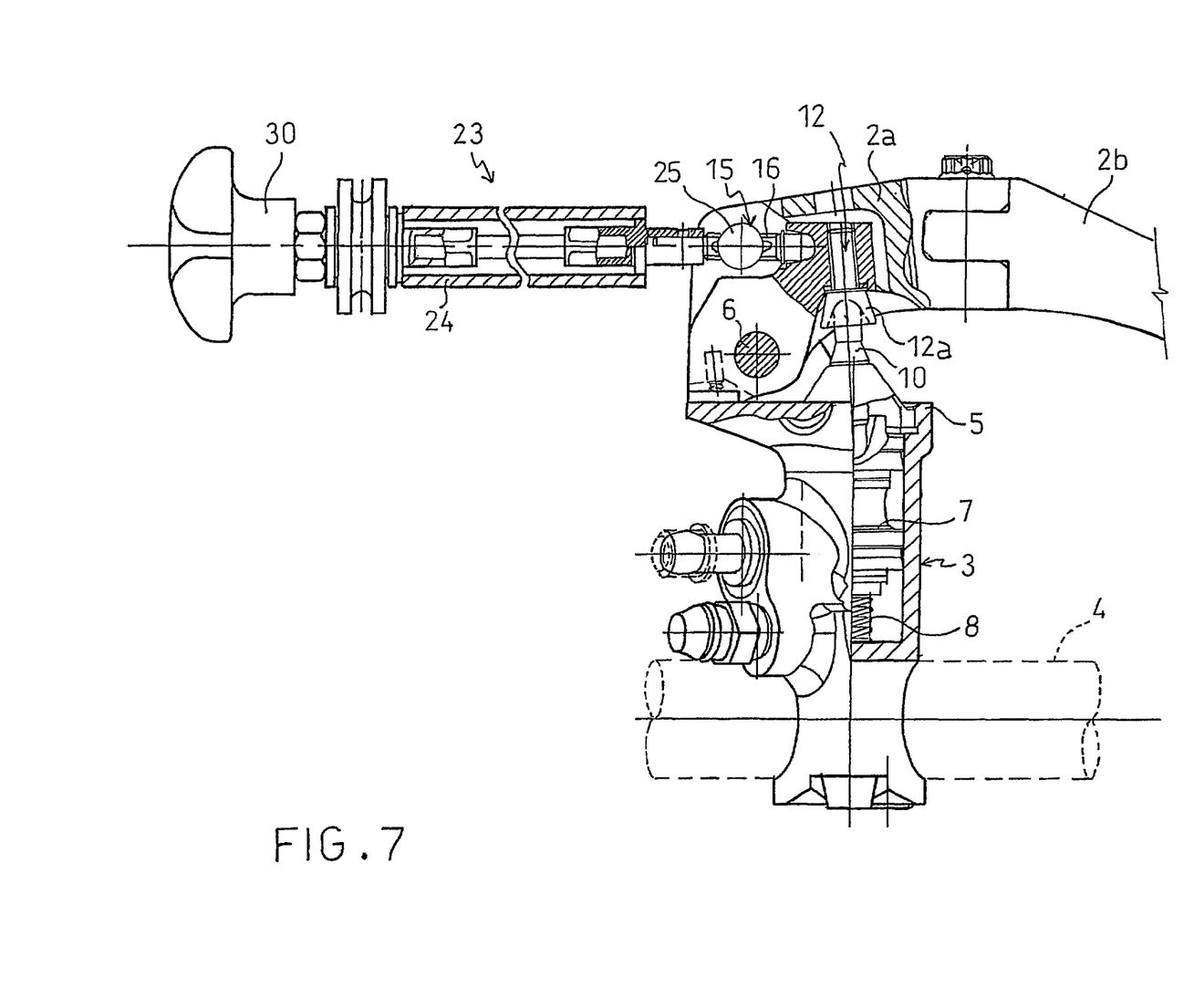
FIG. 7 is a plan view with parts in section of the adjustment device seen in FIG. 1 in accordance with a different use configuration.

If it is wished to rotate the pin 16 using the left hand rather than the right hand, the knurled nut 22 can be replaced with remote means of operation 23 (shown in FIG. 7). In the example considered, the remote means of operation 23 comprise a flexible cable 24 capable of transmitting a twisting moment and connected at one end to the aforementioned end portion of the pin 16 projecting from the end block part 2a of the brake lever 2 and, at the other end, to a control member 30 located in the vicinity of the left-hand handgrip on the left side of the motorcycle handlebar.

It is worth observing that the adjustment device 1 according to the invention does not require the presence of a bevel gear transmission between the end of the threaded pin 16 (which requires rotating) and the end of the flexible cable 24, and this without requiring the cable to negotiate any sharp, short-radius bend.

The adjustment device 1 according to the invention permits a quick and easy interchange between a control member such as the knurled nut 22 and remote means of operation.

In consideration of the above, the adjustment device 1 according to the invention is particularly suitable for use on motorcycles used in competitive sports.

To enable greater sensitivity in the adjustment of the distance of the brake lever 2 from the brake pump 3 and hence from the handlebar 4 handgrip, the adjustment device 1 may advantageously include means 25 for indexed rotary advancing of the threaded pin 16 with respect to the brake lever 2.

Figure 3:
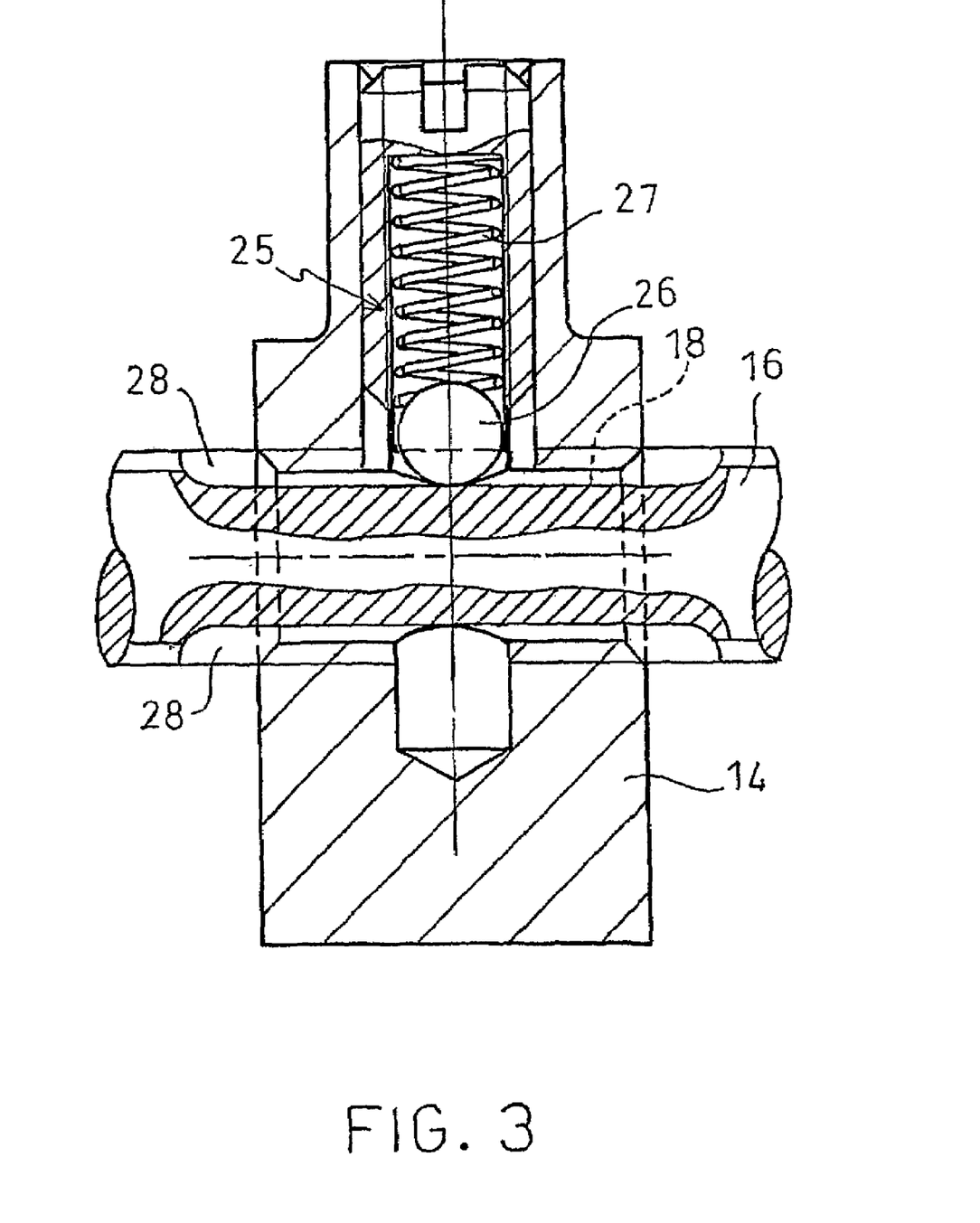
FIG. 3 is a sectional view through a detail of the adjustment device taken on 111-III as marked in FIG. 1.
Figure 4:
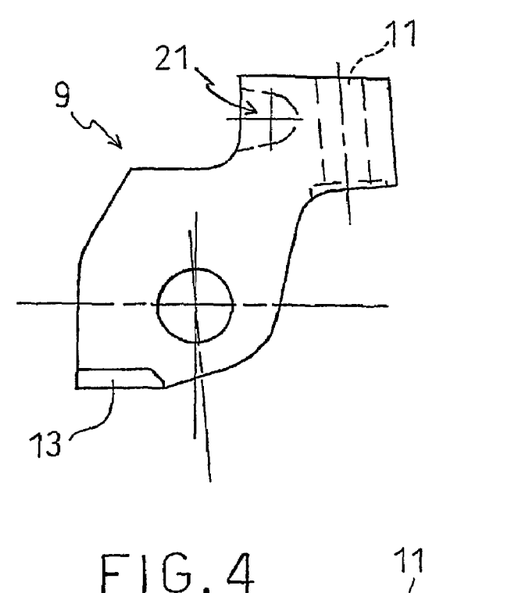
FIG. 4 is a plan view of a detail of the device seen in FIG. 1.
Figure 5:
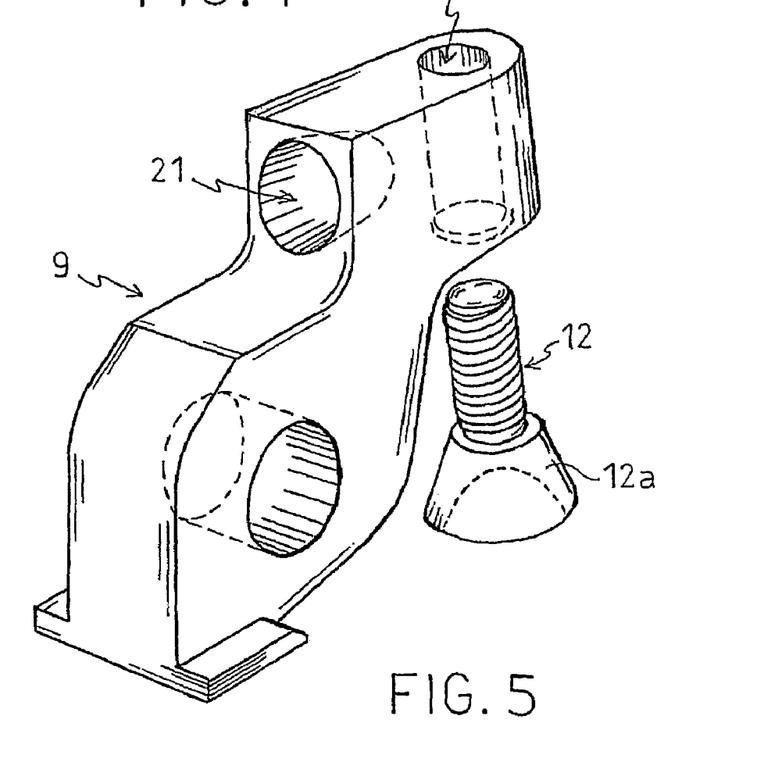
FIG. 5 is a perspective view of the detail seen in FIG. 4.
Figure 6:
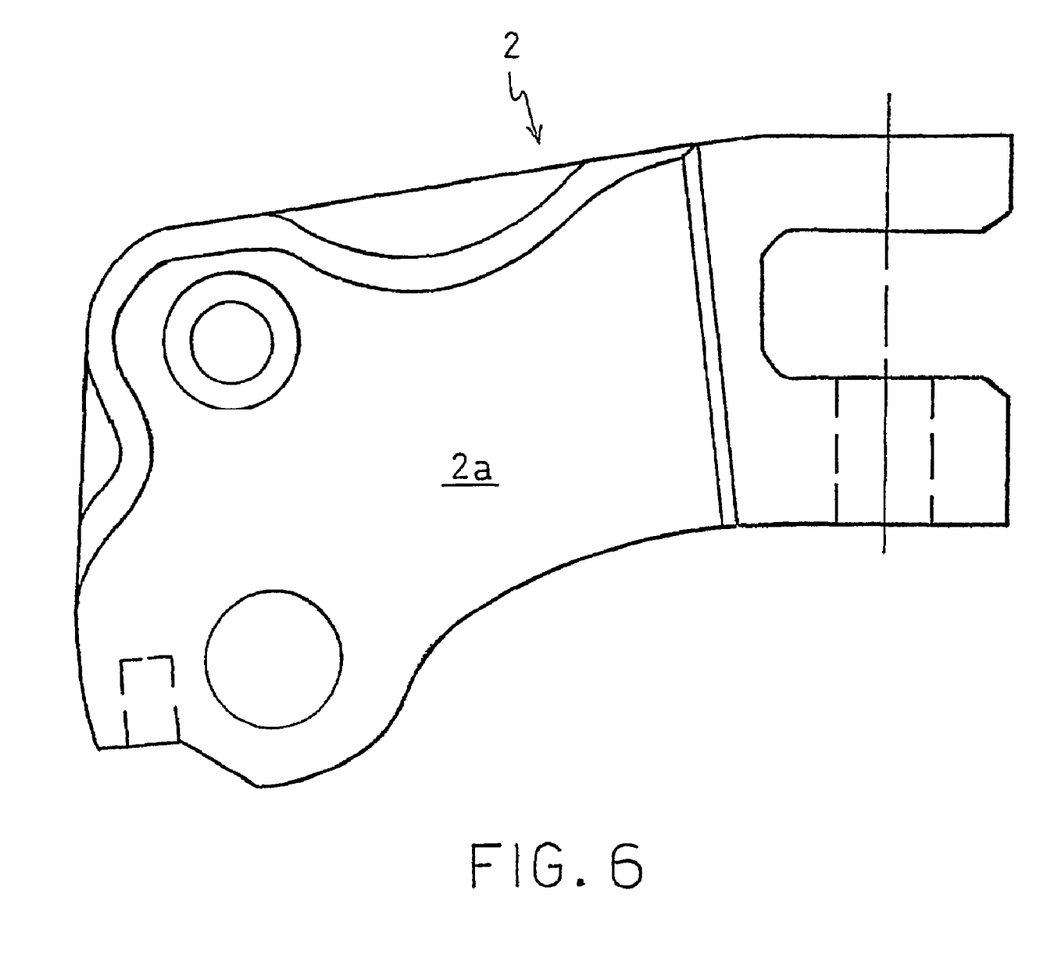
FIG. 6 is a plan view of another detail of the device seen in FIG. 1.

With particular reference to FIG. 3, the means 25 for indexed rotary advancing comprise a ball 26 in a cylindrical hole formed in the centring support 14 transversely with respect to the threaded hole 18 and in communication with the latter. A helical spring 27 acts on the ball 26 and, as the threaded pin 16 rotates, pushes the ball 26 in turn into one indentation, or formed location, 28 of the plurality of axial indentations 28 recessed into the outer surface of the threaded pin 16.

In the operation of the adjustment device 1, it is found that rotation in either direction of the threaded pin 16 with respect to the end block 2a of the brake lever 2 produces a corresponding rotation of the brake lever 2 with respect to the adjustment lever 9 about the common pin 6 and consequently a change in the distance between the slender part 2b of the brake lever 2 and the corresponding handlebar 4 handgrip.

As mentioned, the threaded pin 16 can be rotated by means of a control nut connected to it directly or via a remote means of operation.

As will be appreciated from the above description, the adjustment device according to the invention fulfils the abovementioned requirements and at the same time overcomes the disadvantages referred to in the introductory part of the description.

Other advantages of the adjustment device according to the invention are to be found in:
 the adjustment of the rest position of the pump piston independently of the position of the main lever;
 the option of adopting a highly precise "screw" system of adjustment;
 the simplicity of construction and resulting low cost of manufacture.

Clearly, in order to fulfil particular and specific requirements, a person skilled in the art will be able to make numerous modifications and alterations to the adjustment device according to the invention described above, all however falling within the scope of protection of the invention as defined in the following claims.

For example, in contrast to what is outlined above, the pin 16 may be engaged with the adjustment lever in such a way that it can be adjusted axially along the longitudinal direction X-X and at the same time be in abutment with the brake lever.

In contrast to what is outlined above, if, for manufacturing reasons, the hydraulic actuator is positioned such that its piston moves in the longitudinal direction X-X defined above or in some other direction different from direction Y-Y previously considered, the adjustment lever can simply have a part shaped like an L or in some other equivalent way in order to make the hydraulic actuator efficiently operable.

The invention claimed is:

1. Device for adjusting the position of the operating lever of a hydraulic actuator for a motorcycle, comprising:
 a bracket connectable to a supporting structure,
 a hydraulic actuator connected to the bracket;
 a main lever extending in an essentially longitudinal direction, pivotally mounted on the bracket and intended to be moved towards or away from the hydraulic actuator, the main lever having an outer end portion, and an elongated inner handgrip portion extending inwardly in said longitudinal direction and being movable toward and away from the hydraulic actuator;
 an adjustment lever pivotally mounted on the bracket and functionally connected to the main lever in order to operate the hydraulic actuator when the main lever moves towards the hydraulic actuator, wherein:
 said device also comprises means for adjusting the position of the main lever with respect to the adjustment lever, the adjusting means being accessible from the outer end portion of the main lever and
 comprising a pin oriented along said longitudinal direction and being disposed on the outer end of the outer end portion of the main lever remote from the inner handgrip portion thereof,
 the pin being constructed and positioned for connection to means of remote operation capable of transmitting a twisting moment avoiding short radius bend in the means of remote operation,
 wherein the pin is engaged in such a way that the pin can be adjusted axially along said longitudinal direction on the outer end portion of the main lever, and wherein the pin is engaged in abutment with the adjustment lever, so that a movement in said longitudinal direction of the pin with respect to the main lever corresponds to a change in the position of the main lever with respect to the adjustment lever, the pin comprising a threaded portion, and a centring support pivotally mounted on the main lever, the pin being in threaded engagement with the centring support, so that, by screwing the pin into or out of the centring support, the position of the pin can be adjusted along said longitudinal direction, wherein elastic means acting between opposing end portions of the main lever and of the adjustment lever causes the main lever to rotate towards the hydraulic actuator and maintain contact, with a defined elastic load between the pin and the adjustment lever.

2. The device according to claim 1, comprising means for indexed rotary advancing of the threaded pin with respect to the main lever.

3. The device according to claim 2, in which the means for indexed rotary advancing comprise a ball in a cylindrical seat formed in the centering support, on which ball there acts a spring which, as the pin rotates, pushes the ball in turn into one axial indentation of a plurality of axial indentations recessed into the outer surface of the threaded portion of the pin.

4. The device according to claim 1, in which the pin lies in a continuation of the longitudinal direction of the main lever.

5. The device according to claim 1, in which the main lever and the adjustment lever are both pivotally mounted on the bracket on the same axis.

6. The device according to claim 1, in which the adjustment lever comprises a bearing surface designed to abut against a surface of the bracket so as to define an end of travel for the rotation of the adjustment lever and main lever away from the hydraulic actuator.

7. The device according to claim 1, in which the hydraulic actuator can be operated by means of a control rod and in which the adjustment device comprises adjustment means for adjusting the relative position of the adjustment lever with respect to the control rod.

8. The device according to claim 1, in which a control member is connected to the pin.

9. The device according to claim 1, in which means of remote operation are connected to the pin and extend outwardly from the outer end portion in the longitudinal direction of the main lever.

10. The device according to claim 1 wherein one end of the pin is in abutment in a flared hemispherical recess formed in the adjustment lever.

11. the device according to claim 1, further comprising means of remote operation comprising a flexible cable capable of transmitting a twisting movement, one end of the flexible cable being connected to the pin and the other end being connected to a control member, said flexible cable extending outwardly from the outer end portion in the longitudinal direction of the main lever.

* * * * *